United States Patent [19]
Kuo

[11] Patent Number: 5,704,232
[45] Date of Patent: Jan. 6, 1998

[54] LOCK POSITIONING DEVICE FOR A BICYCLE

[76] Inventor: Wen-tai Kuo, No. 16, Lane 459, Sec. 1, Anho Rd., Tainan, Taiwan

[21] Appl. No.: 716,497

[22] Filed: Sep. 18, 1996

[51] Int. Cl.⁶ .................................................. E05B 71/00
[52] U.S. Cl. ................................. 70/233; 248/229.1
[58] Field of Search ............... 70/233, 248; 224/935, 224/441, 425, 39, 30 R, 32 R; 248/291.1, 230.11, 292.12, 229.1

[56] References Cited

U.S. PATENT DOCUMENTS

| | | | |
|---|---|---|---|
| 576,769 | 2/1897 | Williams | 248/292.12 |
| 632,858 | 9/1899 | Waibel et al. | 248/291.1 |
| 650,211 | 5/1900 | Wirth | 248/291.1 |
| 970,751 | 9/1910 | Pranke | 248/291.1 |
| 1,546,739 | 7/1925 | Le Lande | 248/292.12 |
| 2,926,879 | 3/1960 | Dietrich | 248/291.1 |
| 3,734,439 | 5/1973 | Wintz | 248/291.1 |
| 5,114,060 | 5/1992 | Boyer | 224/443 |
| 5,405,113 | 4/1995 | Jaw | 70/233 |
| 5,458,308 | 10/1995 | Lin | 224/425 |
| 5,522,527 | 6/1996 | Tsai | 224/425 |
| 5,546,776 | 8/1996 | Sun et al. | 70/233 |

FOREIGN PATENT DOCUMENTS

| | | | |
|---|---|---|---|
| 4000430 | 7/1991 | Germany | 70/233 |
| 2278629 | 12/1994 | United Kingdom | 224/935 |

*Primary Examiner*—Steven N. Meyers
*Assistant Examiner*—Tuyet-Phuong Pham
*Attorney, Agent, or Firm*—Dorsey & Whitney LLP

[57] ABSTRACT

A positioning device includes a fastener member fixedly mounted on a supporting post and having an abutting base protruding outwardly from a periphery thereof. A recess is defined in an end face of the fastener member. A substantially U-shaped adjusting rack includes a first arm adjustably mounted on the abutting base and a second arm. A flange protrudes outwardly from an end face of the first arm and is securely received in the recess.

4 Claims, 5 Drawing Sheets

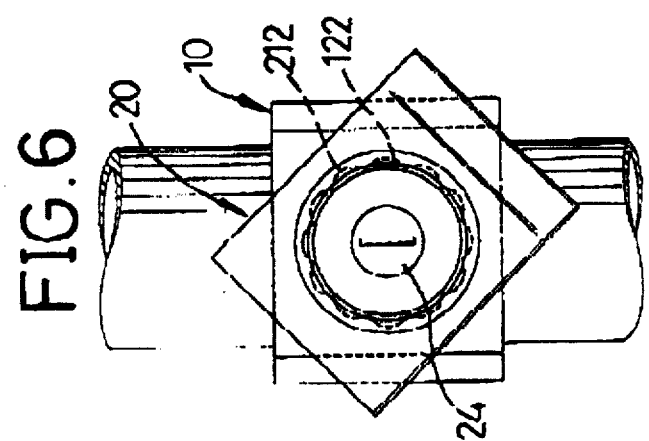
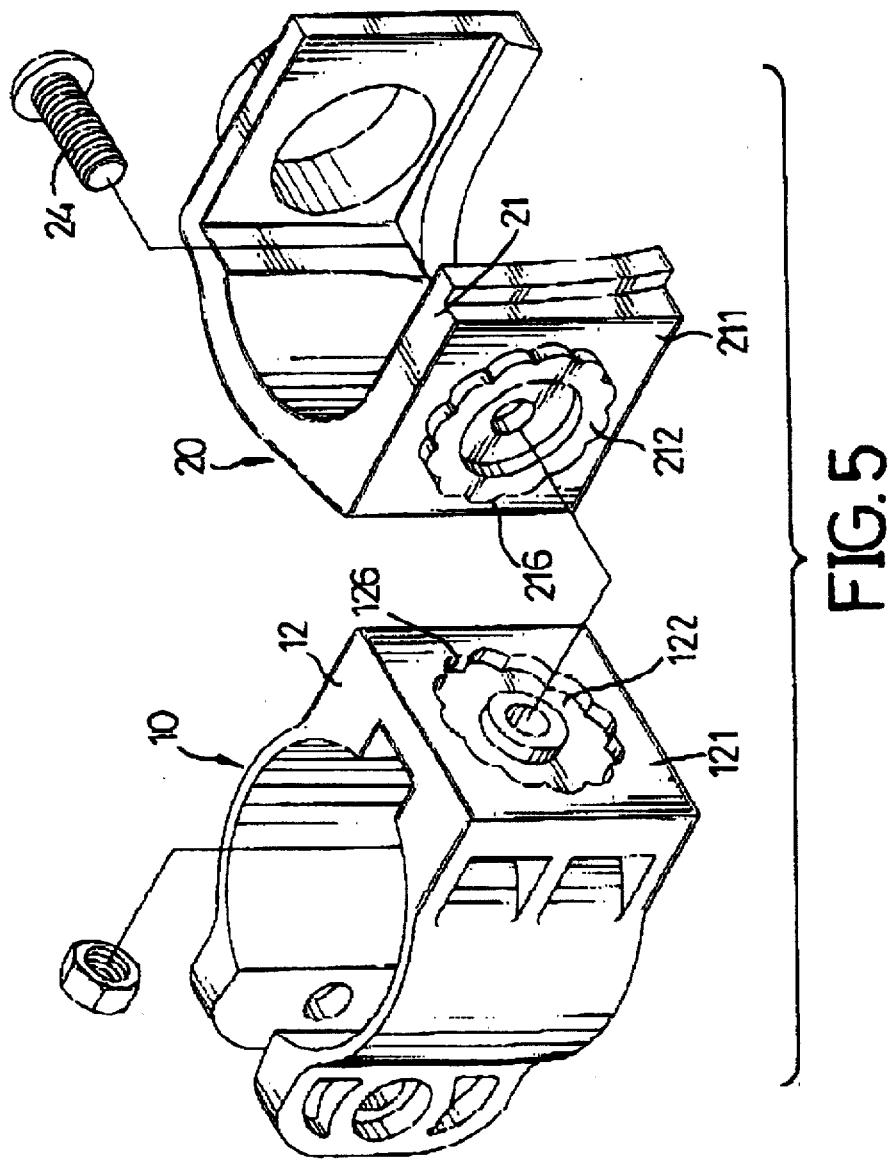

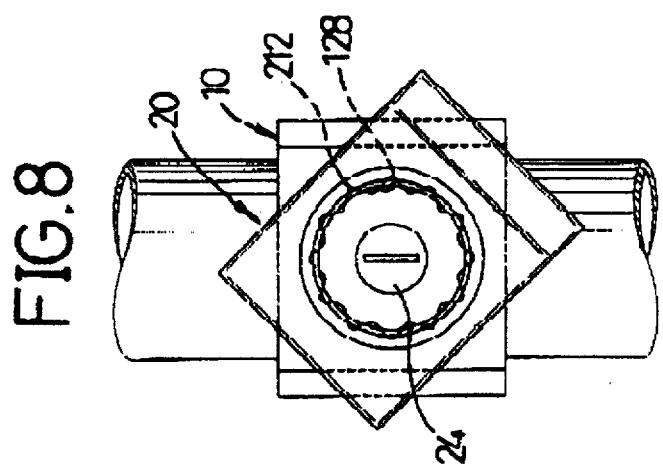
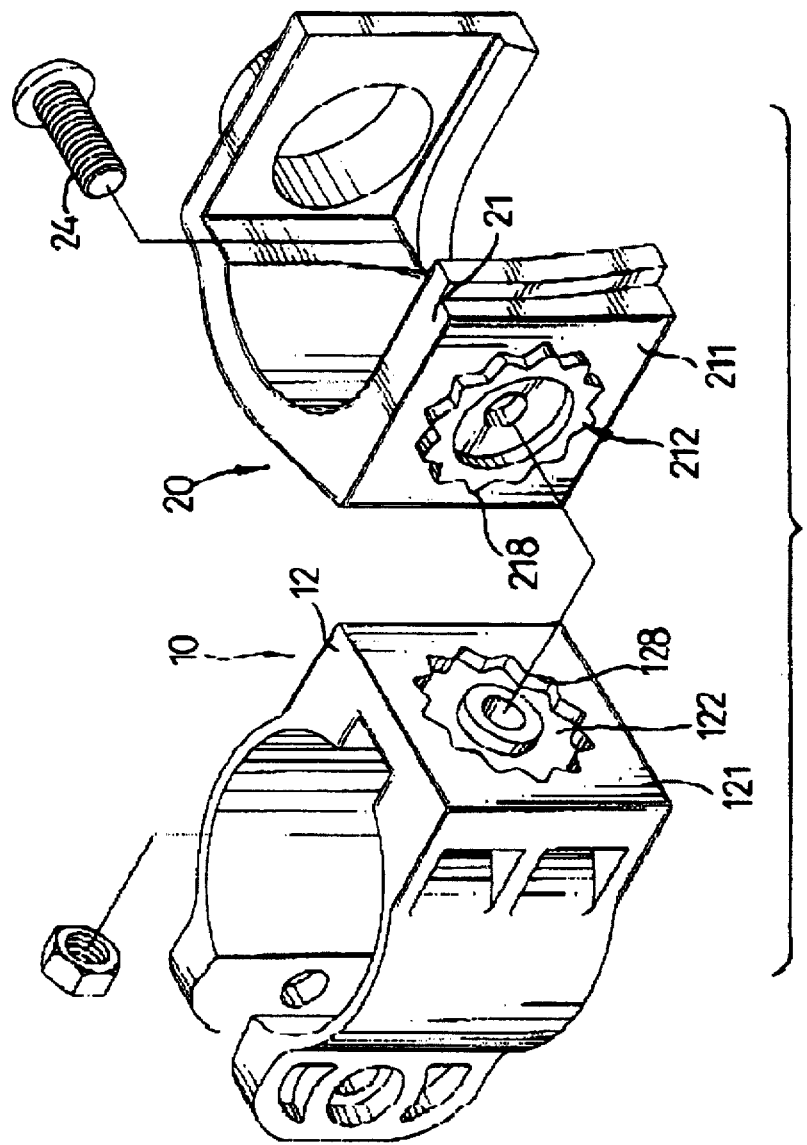

1

LOCK POSITIONING DEVICE FOR A BICYCLE

FIELD OF THE INVENTION

The present invention relates to a lock positioning device, and more particularly to a lock positioning device for a bicycle.

BACKGROUND OF THE INVENTION

A conventional lock positioning device for a bicycle includes a fastener base fixedly mounted on a seat tube or a top tube of the bicycle, and a substantially U-shaped supporting rack integrally formed on or fixedly attached to thereon.

By such an arrangement, however, the supporting rack is secured on the fastener base without the possibility of adjusting an inclined angle of the supporting rack relative to the fastener base, thereby greatly limiting a versatility of the lock positioning device.

The present invention has arisen to mitigate and/or obviate the disadvantage of the conventional positioning device.

SUMMARY OF THE INVENTION

In accordance with one aspect of the present invention, there is provided a positioning device for attaching a lock to a supporting post.

The positioning device comprises a fastener member fixedly mounted on the supporting post and including an abutting base protruding outwardly from a periphery thereof. A recess is defined in an end face of the fastener member. A substantially U-shaped adjusting rack includes a first arm adjustably mounted on the abutting base and a second arm. A flange protrudes outwardly from an end face of the first arm and is securely received in the recess.

Further features of the present invention will become apparent from a careful reading of the detailed description with reference to the accompanying drawings.

BRIEF DESCRIPTION OF THE DRAWINGS

FIG. 5 is an exploded view of a positioning device according to a second embodiment of the present invention;

FIG. 6 is a side operational assembly view of FIG. 5;

FIG. 7 is an exploded view of a positioning device according to a third embodiment of the present invention;

FIG. 8 is a side operational assembly view of FIG. 7; and

DETAILED DESCRIPTION OF THE PREFERRED EMBODIMENTS

Figure 1:
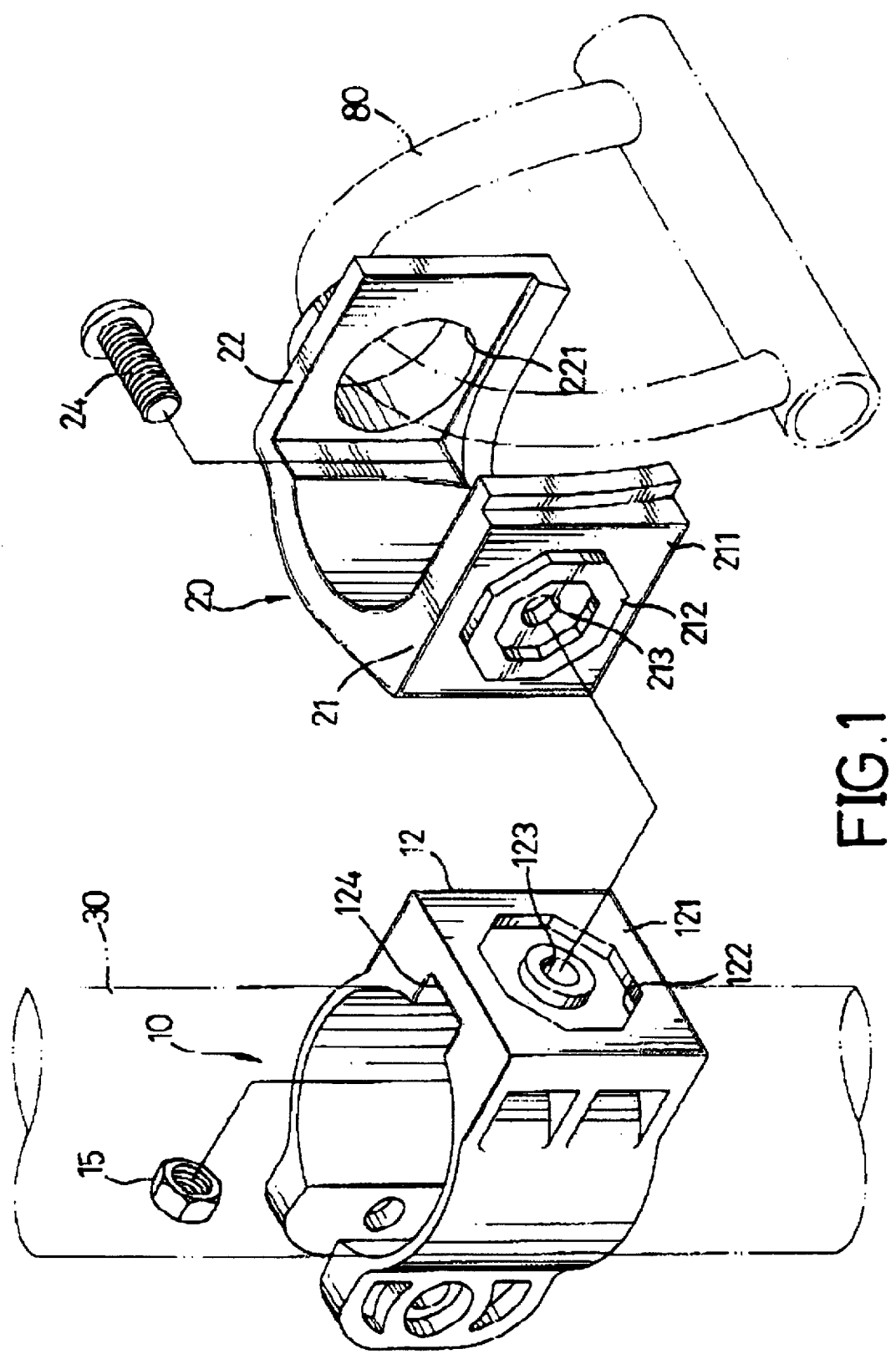
FIG. 1 is an exploded view of a positioning device in accordance with a first embodiment of the present invention.

Referring to the drawings, and initially to FIGS. 1–4, a positioning device in accordance with a first embodiment of the present invention is adapted for attaching a lock 80 to a supporting post 30 of a bicycle (not shown). The supporting post 30 may preferably be a head tube, a seat tube, a top tube, a down tube or a seat post of the bicycle.

The positioning device comprises a fastener member 10 fixedly mounted on the supporting post 30 and including an abutting base 12 protruding outwardly from a periphery thereof. A recess 122 is defined in an end face 121 of the fastener member 10.

A substantially U-shaped adjusting rack 20 includes a first arm 21 adjustably mounted on the abutting base 12 and a second arm 22. A flange 212 protrudes outwardly from an end face 211 of the first arm 21 and is securely received in the recess 122. The second arm 22 has a hole 221 transversely defined therein for holding the lock 80 therein.

Preferably, the recess 122 has a polygonal shape, and the flange 212 has a corresponding polygonal shape and is flush with the recess 122.

The first arm 21 has a first bore 213 transversely defined therein. The abutting base 12 has a second bore 123 transversely defined therein and aligning with the first bore 213.

A positioning bolt 24 is mounted on an inner wall of the first arm 21 and in turn extends through the first and second bores 213 and 123. A nut 15 is mounted on an inner wall of the abutting base 12 and is threadedly engaged on the positioning bolt 24, thereby securely attaching the first arm 21 to the end face 121 of the abutting base 12.

Preferably, the abutting base 12 includes a channel 124 vertically defined in the inner wall thereof for receiving the nut 15 therein.

Figure 3:
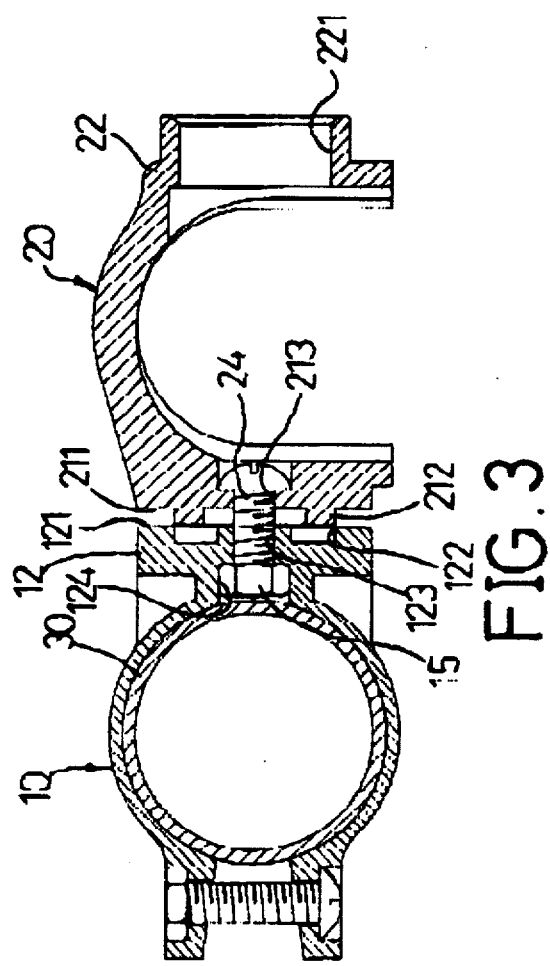
FIG. 3 is an operational view of FIG. 2.
Figure 2:
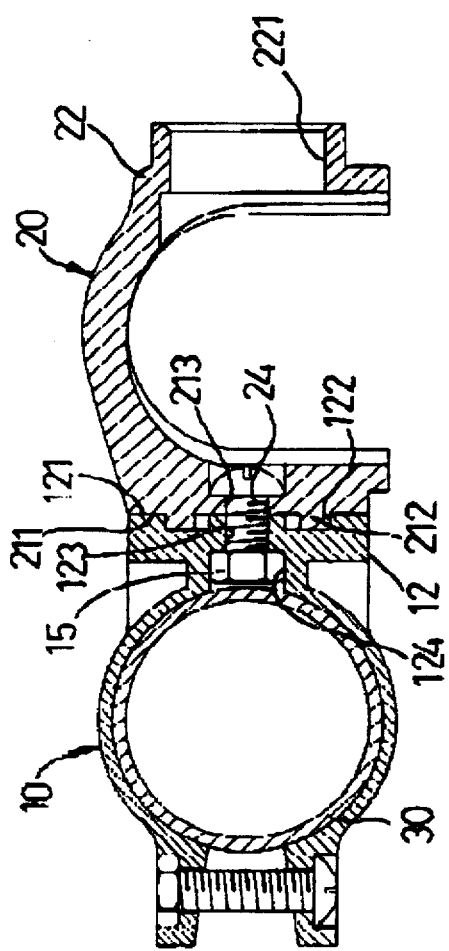
FIG. 2 is a top plan cross sectional assembly view of FIG. 1.

In operation, referring to FIGS. 2 and 3 with reference to FIG. 1, the first arm 21 can be fitted to the abutting base 12 such that the flange 212 can be received in the recess 122. The positioning bolt 24 then extends through the first and second bores 213 and 123 and is threadedly engaged with the nut 15, thereby securely attaching the adjusting rack 20 to the fastener member 10 without a possibility of rotation and deflection due to a tight fitting between the flange 212 and the recess 122.

Figure 4:
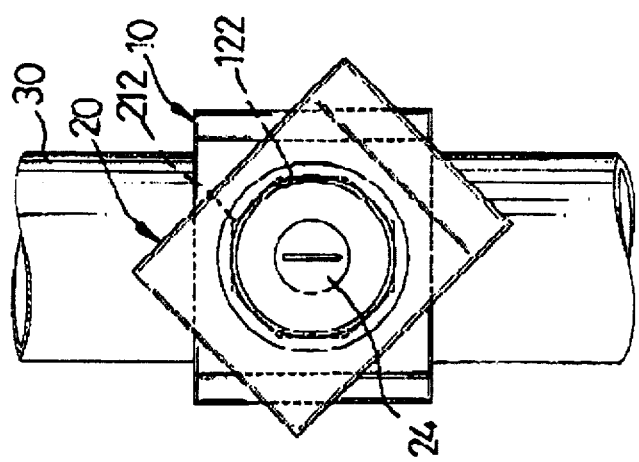
FIG. 4 is a side operational assembly view of FIG. 1.

Referring to FIGS. 2–4 with reference to FIG. 1, the flange 212 can be released from the recess 122 by slackening the positioning bolt 24 and the nut 15 as shown in FIG. 3 such that the first arm 21 of the adjusting rack 20 can be rotated relative to the abutting base 12 until the flange 212 again matches and is received in the recess 122.

The positioning bolt 24 can then be further securely tightened with the nut 15 such that the adjusting rack 20 can be again securely attached to the fastener member 10 as shown in FIG. 2, thereby adjusting an inclined angle of the adjusting rack 20 relative to the fastener member 10 as shown in FIG. 4.

Referring to FIGS. 5 and 6, in accordance with a second embodiment of the present invention, the recess 122 is defined by an outer peripheral edge comprising a series of arcuate grooves 126 defined in the end face 121 of the abutting base 12, and the flange 212 is formed with an outer peripheral edge comprising a series of arcuate portions 216 arranged on the end face 211 of the first arm 21 and each received in each of the series of arcuate grooves 126.

Referring to FIGS. 7 and 8, in accordance with a third embodiment of the present invention, the recess 122 is defined by an outer peripheral edge comprising a series of notches 128 in the end face 121 of the abutting base 12, and the flange 212 is formed with a outer peripheral edge comrising a series of v-shaped teeth 218 arranged on the end face 211 of the first arm 21 and each received in each of the series of notches 128.

Figure 9:
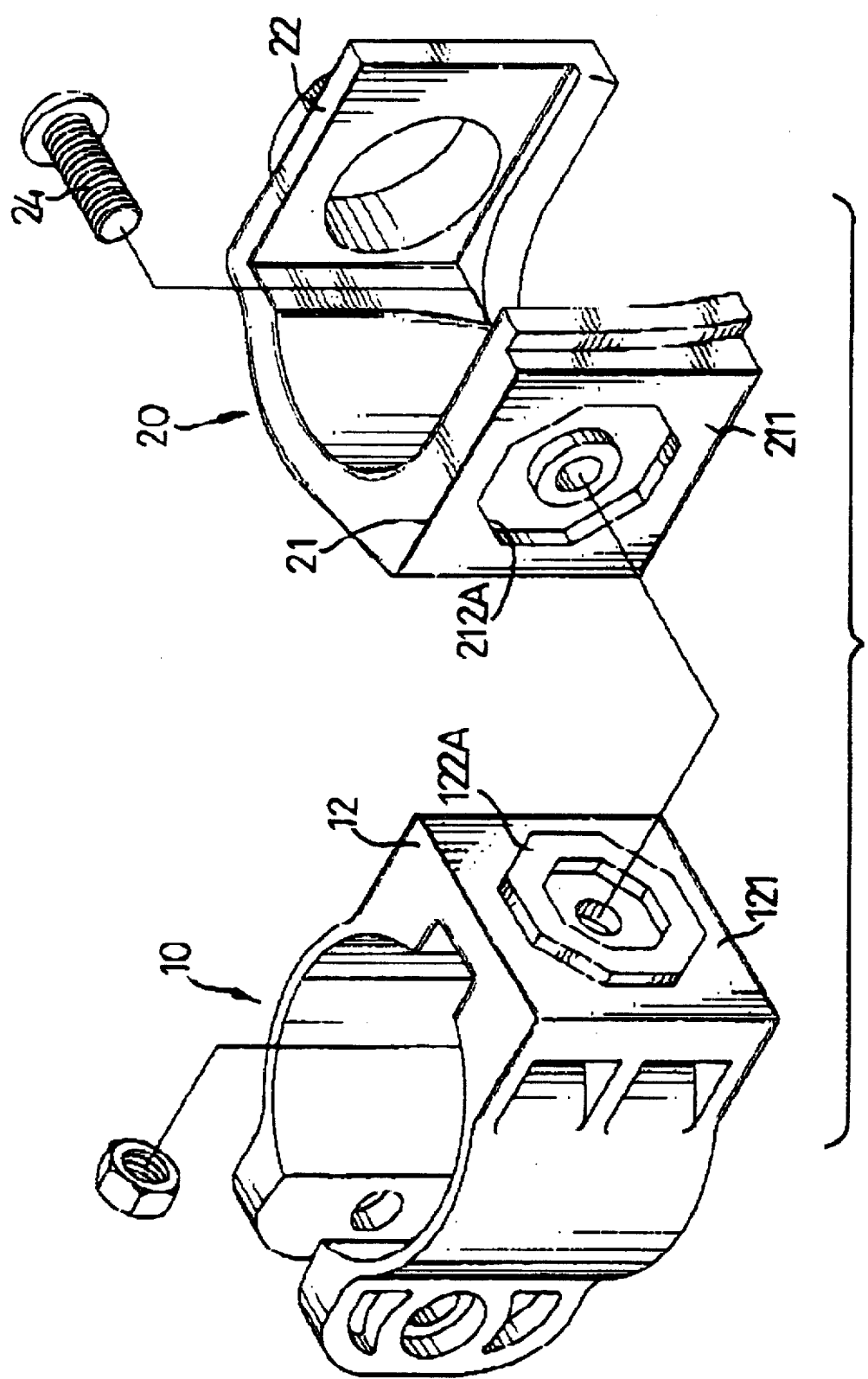
FIG. 9 is an exploded view of a positioning device according to a fourth embodiment of the present invention.

Referring to FIG. 9; in accordance with a fourth embodiment of the present invention, a polygonal flange 122A is formed on and protrudes from the end face 121 of the abutting base 12, and a polygonal recess 212A is defined in the end face 211 of the first arm 21 for securely receiving the polygonal flange 122A therein.

It should be clear to those skilled in the art that further embodiments of the present invention may be made without departing from the scope and spirit of the present invention.

What is claimed is:

1. A positioning device for attaching a lock to a supporting post and comprising:

a fastener attachable to said supporting post and having a base defining a vertical end face and a hole extending transversely therethrough, said base further defining a shaped recess in said vertical end face;

a substantially U-shaped adjusting rack including first and second arms, said first arm defining a vertical face rotatably abutting said vertical end face of said fastener base and a bore extending transversely therethrough in alinement with said hole, and a flange corresponding in shape to said recess and protruding outwardly from said vertical face of said first arm and securely received in said recess, said flange being rotatably positionable relative to said recess when said flange is detached from said recess such that said first and second arms are rotatable and adjustable in a vertical plane relative to said fastener base;

a positioning bolt mounted on an inner wall of said first arm and extending through said bore of said first arm and said hole of said fastener base; and a nut mounted on an inner wall of said fastener base and threadably engaged on said positioning bolt for tightening onto said bolt to hold said fastener and said adjusting rack securely together.

2. The positioning device in accordance with claim 1, wherein said recess has a polygonal shape, and said flange has a polygonal shape and is securely received within said recess.

3. The positioning device in accordance with claim 1, wherein said recess is defined by an outer peripheral edge comprising a series of arcuate grooves defined in the vertical end face of said fastener base, and said flange is formed with an outer peripheral edge comprising a series of arcuate grooves each serially arranged on the vertical end face of said first arm and each received in a corresponding one of said arcuate grooves on said fastener base.

4. The positioning device in accordance with claim 1, wherein said recess is defined by an outer peripheral edge comprising a series of notches defined in the vertical end face of said fastener base, and said flange is formed with an outer peripheral edge comprising a series of V-shaped teeth each serially arranged on the vertical end face of said first arm and each received in a corresponding one of said notches.

* * * * *